United States Patent [19]
Morreale

[11] 4,096,625
[45] Jun. 27, 1978

[54] METHOD FOR INTERCONNECTING STATOR COILS

[75] Inventor: Anthony P. Morreale, Whittier, Calif.

[73] Assignee: Rapidsyn Co., Santa Fe Springs, Calif.

[21] Appl. No.: 776,317

[22] Filed: Mar. 10, 1977

Related U.S. Application Data

[62] Division of Ser. No. 629,715, Nov. 7, 1975, Pat. No. 4,039,875.

[51] Int. Cl.² ............................................. H02K 15/00
[52] U.S. Cl. ..................................... 29/596; 29/626; 29/628; 310/71; 310/DIG. 6
[58] Field of Search ................ 29/596, 605, 625, 626, 29/628; 310/71, DIG. 6, 194, 42

[56] References Cited

U.S. PATENT DOCUMENTS

| 3,495,109 | 2/1970 | Ames | 310/71 |
| 3,781,980 | 1/1974 | Possis | 29/596 |
| 3,862,492 | 1/1975 | Crabb | 29/596 |
| 3,869,628 | 3/1975 | Koritsky et al. | 310/179 |
| 3,984,712 | 10/1976 | Hill | 310/71 |

*Primary Examiner*—Carl E. Hall
*Attorney, Agent, or Firm*—Christie, Parker & Hale

[57] ABSTRACT

A motor stator having a salient pole magnetic core on which are wound coils of conductive wire incorporating an annular printed circuit board having a plurality of radially projecting terminals. The printed circuit board is secured directly to the projecting ends of the coils at one end of the core and the two wire ends of each coil are secured to pairs of adjacent terminals on the board. External electrical leads are then threaded through the core between the coils with one end of the respective leads electrically joined to terminals on the board.

3 Claims, 8 Drawing Figures

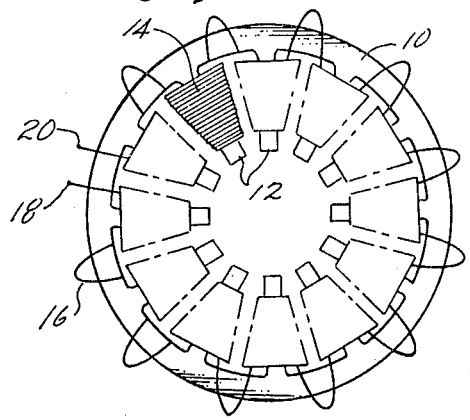
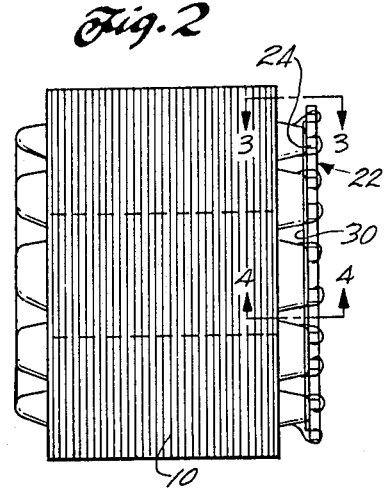
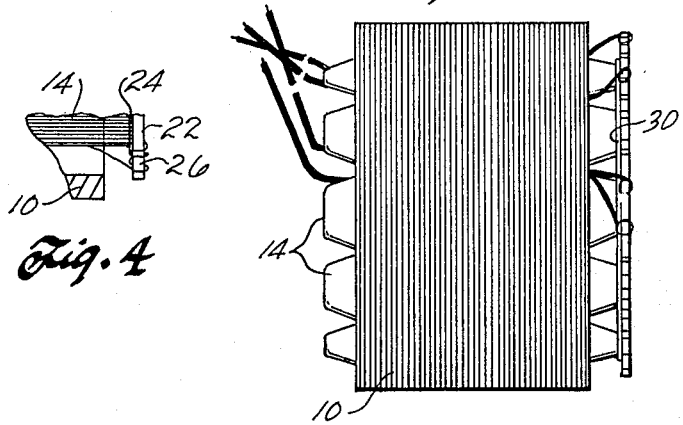
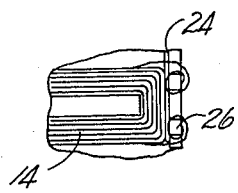
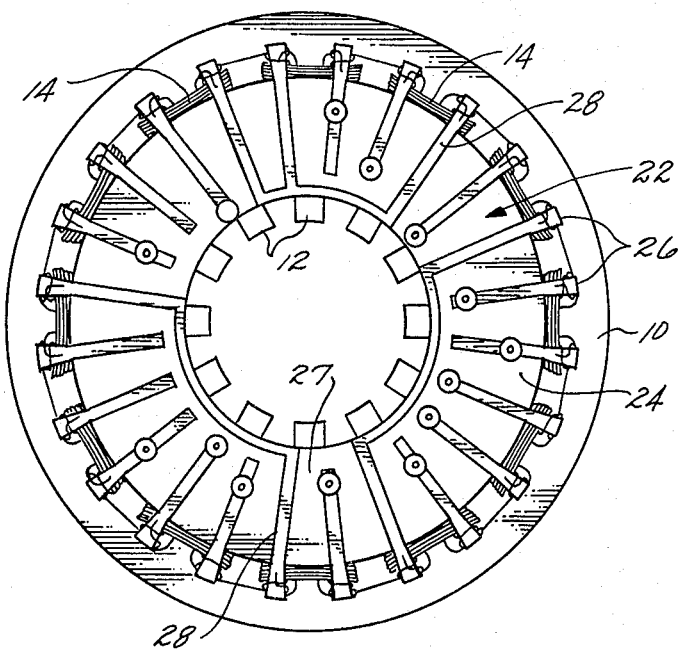

METHOD FOR INTERCONNECTING STATOR COILS

RELATED PATENT APPLICATION

This application is a division of application Ser. No. 629,715, filed Nov. 7, 1975, now U.S. Pat. No. 4,039,875.

FIELD OF THE INVENTION

This invention relates to the wiring of motor stators, and more particularly, is concerned with a method for interconnecting coil wires with external leads by means of a printed circuit board.

BACKGROUND OF THE INVENTION

The manufacture of electrical motors has experienced a continuing evolution in the effort to reduce cost. The stator of small induction motors, and particularly the case of small synchronous or stepping type motors which may involve six or more poles, coils have been separately wound and then inserted on the poles formed by the stator stack or core. The separate winding of the coils permitted sets of coils to be wound from a continuous wire so that after the coils were positioned on the stack, interconnection of the coils was already complete and only the external leads to the coils had to be attached. In the past, the stranded lead wires were soldered directly to the ends of the coil wires and the soldered joints were insulated and secured in place by sewing into the coil head. This method of wiring the stators required a considerable amount of hand labor. Various techniques have heretofore been proposed for machine wiring the coils directly on the stack. While such techniques have been developed for larger size motors, only recently have machine wiring techniques been developed which are capable of winding coils on very small size stator stacks. However, machine wiring has presented a problem in interconnecting the coils and the external leads. Unlike hand-wired coils, the machine-wired coils cannot effectively be wound in sets from a continuous wire. This means that internal connections have to be made be made between pairs of coils on opposing poles after the winding process is completed. Furthermore the much tighter winding of the coils of wire have made it difficult to effectively tie leads to the coils. This has made it difficult to secure the leads and the intercoil connections in the stator structure.

One method utilized in the past has been to provide a terminal board secured to the frame of the motor to which the coil ends are brought out and secured after the stator is mounted in the motor frame. External leads are then secured to the terminal board to complete the stator wiring connections. Because the board is spaced from the coil, unsupported lengths of solid copper coil wire results from this type of construction and because the coil wire is fragile and subject to fatigue, and fracturing under continuous vibration, external connections of this type have not proved entirely satisfactory. Thus the savings in machine winding of the coils has been minimized by the difficulties experienced in forming the interconnection between the coils and with the external leads.

SUMMARY OF THE INVENTION

The present invention is directed to an improved method and apparatus for interconnecting the coils and connecting the external leads to the coils in a machine-wound salient pole stator. The present invention utilizes a printed circuit terminal board which is mechanically attached to the projecting coil ends at one end of the stack. The printed circuit provides the necessary electrical connections between the coils. Close spacing between the terminal board and the coils reduces the length of exposed coil wire at the ends of the coils. The coils can be tightly wound on the stack since it is not necessary to allow any space under the coils for mechanical fastening, such as tying down of the leads. This substantially reduces the amount of copper required to form the coils and greatly improves the heat transfer from the coil to the stack, thereby providing better heat dissipation. Leads can be readily changed or attached after the stator assembly winding is completed.

This is accomplished, in brief, by first winding the coils by machine on the stator stack and bringing out the two wire ends of each coil at one end of the stack. An annular circuit board having a plurality of radially projecting terminals (two for each coil) is positioned and held against the exposed ends of the coils by an intermediate layer of pressure-sensitive adhesive. The ends of the coils are then wrapped around and soldered to the radially projecting terminals. External leads are then attached to the circuit board by passing the leads through the stack between adjacent coils and soldering one end of the leads to terminals on the circuit board. The assembly is then dipped in varnish which impregnates the coils and the circuit board, thereby firmly and permanently securing the board in place against the ends of the coil.

DESCRIPTION OF THE DRAWINGS

For a better understanding of the invention, reference should be made to the accompanying drawings, wherein:

FIG. 1 is an end view of the stator after the coils have been machine wound on the salient poles of the stack;

FIG. 2 is a side view of the stator assembly with the printed circuit terminal board in position;

FIG. 3 is a fragmentary enlarged sectional view taken substantially on the line 3—3 of FIG. 2;

FIG. 4 is a fragmentary sectional view taken substantially on the line 4—4 of FIG. 2;

FIG. 5 is an end view of the completed stator assembly;

FIG. 6 is a side view of the completed stator assembly showing the connection of the external leads.

DETAILED DESCRIPTION

Referring to FIG. 1, the stator is shown at the intermediate stage following machine winding of the stack. The numeral 10 indicates generally the magnetic core of the stator which is made up of a stack of laminations in conventional manner. The stator core is formed with a plurality of inwardly projecting salient poles 12, the inner ends of which are machined to define a cylindrical shaped opening in which the rotor of the motor (not shown) rotates after the motor is assembled. The machine winding process wraps a continuous length of solid copper wire on each pole, advancing from pole to pole in sequence around the circumference of the stator core 10, the coils being indicated at 14. The wire between adjacent coils is brought out in loops 16, the continuous wire forming the coils terminating at either end, as indicated at 18 and 20. While a 12-pole motor is shown by way of example, the invention is not limited to a stator of any specific number of poles.

Figure 7:
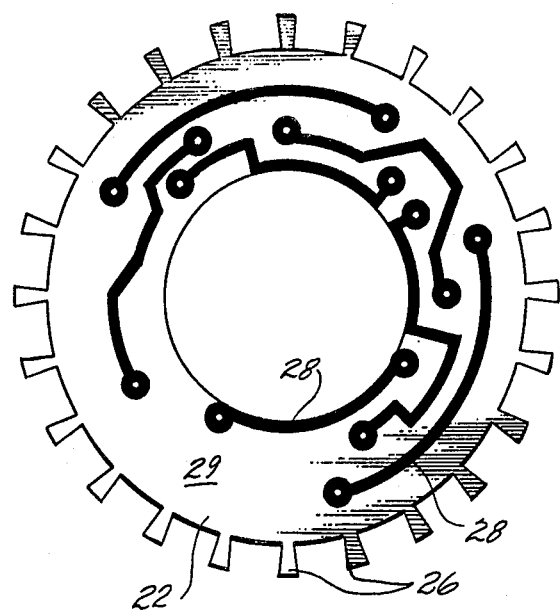
FIGS. 7 and 8 are detailed planned views of the two sides of the printed circuit terminal board.
Figure 8:
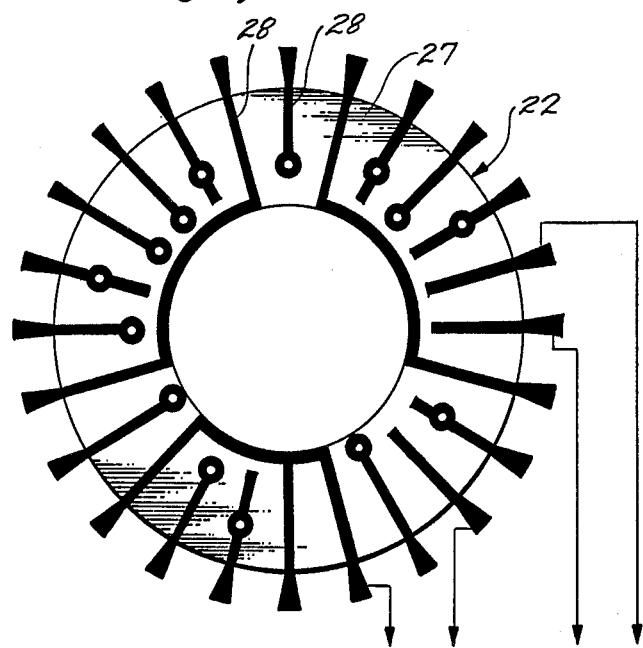

After the coils are wound on the stator core, a printed circuit terminal board 22, shown in detail in FIGS. 7 and 8, is secured to the end position on the projecting wire coils at one end of the stack. The terminal board includes a substrate 24 of insulating material having an annular shape with a plurality of radial projections 26 equally spaced about the outer perimeter of the board. The number of projections 26 is twice the number of coils wound on the stator, i.e., two projections per coil. Etched on the top surface 27 of the terminal board 24, by conventional printed circuit techniques, is a pattern of conductive strips 28 which extend radially out to the ends of each of the projections 26 to form electrical terminals. Some of the strips are interconnected on the top of the board while others are interconnected by extending the conductive metal through holes in the board to strips on the opposite side of the board, as shown in FIG. 7. The printed circuit pattern of connections, shown in FIGS. 7 and 8, is by way of example only and shows the interconnection for the stator coils of a 12-pole stepping motor.

A washer 30 of insulating material having a pressure sensitive adhesive layer on both sides is applied to the surface 29 of the circuit board thus providing an insulated covering for the exposed printed circuit conductors. The exposed surface of the washer with its pressure-sensitive adhesive is then pressed against the projecting ends of the coils 14, as shown in FIG. 2, to hold the board in place during subsequent assembly of the completed stator. The pressure-sensitive adhesive holds the terminal board in place on the ends of the coils with the annular board being coaxial with the stator. The wire loops 16 between adjacent coils are cut and the two wire ends of each coil are then brought out and wrapped around a pair of adjacent projections 26, the wrapped ends of the coil being in electrical contact with the conductive surface on the top side 27 of the printed circuit board.

After the coil ends are wrapped on the respective terminals, a solder joint may be formed to bond the coil ends to the terminals on the board. The wire connections act to further anchor the terminal board in position.

After the terminal board is wired in place, external leads are connected to the terminal board by passing the leads through the length of the stack in the spaces between adjacent coils, and soldering the ends of the external leads to the appropriate terminals on the board 22. The entire assembly can then be dipped by means of the external leads into a varnish pot, removed and dried. The varnish coats and seals the coils in place and also acts to bond the terminal board and coils more firmly together to form an integral structure.

From the above description it will be seen that an improved method and apparatus is provided for interconnecting the coils of a stator and providing connection to external leads. The arrangement lends itself particularly to machine-wound stators in which the connection between coils must be completed after the coils are wound in position. The invention provides a rugged compact assembly which acts to securely anchor the external leads in a manner which allows the leads to be easily changed or attached after the winding stator assembly is completed.

What is claimed is:

1. The method of providing electrical connections to a plurality of individual wire coils wound on a salient pole motor stator, comprising the steps of: bringing the two ends of the wire forming each coil out together at the same end of the coil, forming an annular shaped printed circuit board having a plurality of radially outwardly projecting terminals electrically interconnected by the printed circuit, positioning the annular board coaxially on one end of the stator against the ends of the coils from which the ends of the wires are brought out, wrapping and securing the wire ends of each of the individual coils to adjacent ones of the radial terminals of the circuit board, and attaching external leads to terminals on the board.

2. The method of claim 1 wherein the external leads are passed through the stator between the coils from the terminal board.

3. The method of claim 1 wherein pressure-sensitive adhesive is applied to one side of the board before the board is positioned against the ends of the coils to hold the board in place on contact with the coil ends while the coil ends are wrapped and secured to the radial terminals.

* * * * *